US006584233B1

(12) United States Patent
Kane et al.

(10) Patent No.: US 6,584,233 B1
(45) Date of Patent: Jun. 24, 2003

(54) METHOD FOR DETERMINING THE COMPONENTS OF IMAGE NOISE PATTERNS OF AN IMAGING DEVICE AND USE OF THIS METHOD IN AN IMAGING DEVICE

(75) Inventors: Paul J. Kane, Rochester, NY (US); Theodore F. Bouk, Rochester, NY (US); Peter D. Burns, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/356,584

(22) Filed: Jul. 19, 1999

(51) Int. Cl.$^7$ ................................................. G06K 9/40
(52) U.S. Cl. ...................................... 382/254; 382/275
(58) Field of Search ................................ 382/254, 167, 382/264, 263, 275; 358/463

(56) References Cited

U.S. PATENT DOCUMENTS

| | | | |
|---|---|---|---|
| 4,956,873 A | 9/1990 | Samuels et al. | 382/54 |
| 5,537,669 A | 7/1996 | Evans et al. | 364/807 |
| 5,799,111 A | * 8/1998 | Guissin | 382/254 |
| 5,892,700 A | 4/1999 | Haardt | 382/141 |
| 6,151,139 A | * 11/2000 | Haded et al. | 358/487 |

OTHER PUBLICATIONS

S. Hummer–Miller, "Techniques for Noise Removal and Registration of TIMS Data", *Photogrammetric Engineering and Remote Sensing*, vol. 56, No. 1, Jan. 1990, pp. 49–53.
D. L. Helder, "A Technique for the Reduction of Banding in Landsat Thematic Mapper Images", *Photogrammetric Engineering & Remote Sensing*, vol. 58, No. 10, Oct. 1992, pp. 1425–1431.
J. Beyerer et al., "Adaptive Separation of Random Lines and Background", *Optical Engineering*, vol. 37, No. 10, Oct. 1998, pp. 2733–2741.

R. Navarro et al., "Robust Method for Texture Synthesis–by–Analysis Based on a Multiscale Gabor Scheme", *SPIE*, vol. 2657, pp. 86–96.
D. Carevic, "Application of Partial Modeling Techniques for Texture Segmentation", *Journal of the Optical Society of America*, vol. 14, No. 11, Nov. 1997, pp. 2924–2937.
P. D. Burns. "Measurement of Random and Periodic Image Noise in Raster–Written Images", *SPSE Conference on Advances in Non–Impact Printing Technologies*, 1984, pp. 139–142.
T. Bouk et al., "Measurement of Graininess for Halftone Electrophotography", *Proceedings of the IS&T's Eighth International Congress on Advances in Non–Impact Printing Technologies*, Oct. 1992, pp. 166–170.
F. J. Harris, "On the Use of Windows for Harmonic Analysis with the Discrete Fourier Transform", *Proceedings of the IEEE*, vol. 66, No. 1, Jan. 1978, pp. 51–83.

* cited by examiner

*Primary Examiner*—Jerome Grant, II
(74) *Attorney, Agent, or Firm*—Thomas H. Close

(57) ABSTRACT

A method and a computer program for determining at least one component of a noise pattern of an imaging device. The method comprises the steps of: providing flat field data; forming a preliminary estimate of banding components by computing one-dimensional averages of the flat field data and carrying out a Fourier analysis of the one dimensional averages; determining the banding components by carrying out a two-dimensional Fourier analysis of the original flat field data, and comparing the result to the preliminary estimate; removing the banding components from the flat field data, to obtain modified flat field data; forming a second preliminary estimate of streaking components by carrying out a Fourier analysis on the modified flat field data; determining the two-dimensional random noise statistics by carrying out a Fourier analysis on the modified flat field data; and determining the streaking components by modifying the preliminary estimate of the streaking components with the two-dimensional random noise statistics.

11 Claims, 11 Drawing Sheets

METHOD FOR DETERMINING THE COMPONENTS OF IMAGE NOISE PATTERNS OF AN IMAGING DEVICE AND USE OF THIS METHOD IN AN IMAGING DEVICE

FIELD OF THE INVENTION

This invention relates to a method for determining the components of image noise patterns of an imaging device and use of this method in an imaging device. More particularly, this invention relates to a method for the separation of the components of nonuniformity assignable to banding (one-dimensional periodic noise), streaking (one-dimensional random noise), and granularity (two-dimensional random noise) from a flat field scan produced by a digital imaging system.

BACKGROUND OF THE INVENTION

Certain photographic or digital imaging components introduce a two-dimensional random noise into the image. In photographic components, this is the result of the random distribution of the photographic imaging elements or grains, and is termed granularity. In digital components, such two-dimensional noise can be generated by quantum or thermal fluctuations which are introduced into the electronic signal recorded by the individual pixels, and which vary randomly from pixel to pixel. Furthermore, digital imaging components may also introduce one-dimensional artifacts into the image, such as banding (one-dimensional periodic noise) or streaking (one-dimensional random noise). The spatial structure of these artifacts can be characterized by examining their microdensity profile, which can be thought of as a plot of the opacity of the image as a function of x and y spatial coordinates. The banding artifact is characterized by regularly spaced lines having a periodic microdensity profile, whereas the streaking artifact is characterized by a superposition of lines of random width, and spacing, leading to a random microdensity profile. Banding may result from periodic positioning errors in the placement of a one-dimensional pixel array, whereas streaking may result from random variations between the responses of adjacent pixels in a one-dimensional array. In all cases, the above artifacts are most visible and objectionable in uniform or featureless areas of an image.

During the development and manufacture of imaging components, such components are frequently tested for their tendency to introduce the above artifacts by examination of a flat field or featureless image produced by the imaging system. For example, such an image can be produced by capturing a uniform gray or colored background in a camera or scanner, and examining the captured image. In another example, a digital printer can be tested by creating a synthetic digital image in which all pixels are set to exactly the same digital code value, printing or displaying this image, and examining the output.

Several techniques have been suggested in the technical and patent literature for the evaluation and correction of the above artifacts in image or signal data. Most of these techniques pertain directly to the correction of the images or output produced by the system. For example, U. S. Pat. No. 4,956,873 issued Sep. 11, 1990 to Hockley et al., entitled "Image Processing Apparatus" discloses an image processing apparatus for the correction of banding, while others have described image processing algorithms which attempt to filter out the banding from the resulting digital image (see S. Hummer-Miller, "Techniques for Noise Removal and Registration of TIMS Data", *Photogrammetric Engineering and Remote Sensing*, Vol. 56, No. 1, January 1990, pages 49–53; or D. L. Helder,et al., "A Technique for the Reduction of Banding in Landsat Thematic Mapper Images", *Photogrammetric Engineering and Remote Sensing*, Vol. 58, No. 10, October 1992, pages 1425–1431). The removal of random lines from the image background has also been addressed (see J. Beyerer et al., "Adaptive Separation of Random Lines and Background", *Optical Engineering*, Vol. 37, No. 10, October 1998, pages 2733–2741). Other examples have addressed the issues of signal recovery in the presence of artifacts, via spectral analysis (see U. S. Pat. No. 5,892,700 issued Apr. 6, 1999 to Martin Haardt, entitled "Method for the High-Resolution Evaluation of signals for One or Two-Dimensional Directional or Frequency Estimation"), or texture analysis and segmentation (see R. Navarro et al., "Robust Method for Texture Synthesis-by-Analysis Based on a Multiscale Gabor Scheme," *Proceedings of the SPIE*, Vol. 2657, pages 86–96, 1996; or D. Carevic et al., "Application of Partial Modeling Techniques for Texture Segmentation," *Journal of the Optical Society of America*, Vol. 14, No. 11, November 1997, pages 2924–2937). In U.S. Pat. No. 5,537,669 issued Jul. 16, 1996 to Braddon et. al. entitled "Inspection Method and Apparatus for the Inspection of Either Random or Repeating Patterns", the semiconductor industry has developed techniques for defect inspection which rely on the identification of repeating patterns.

SUMMARY OF THE INVENTION

In the characterization of imaging component performance at the design or manufacturing stages, it is crucial to obtain precise and accurate data pertaining to the artifacts introduced by these components. The most accurate data will be derived from flat field scans, in which the artifacts are most visible and can be most accurately characterized, given the absence of image features. More importantly, the task of characterizing and separating the artifacts described above is considerably more complex when the artifacts are present in combination. One, two or all three of the artifacts may be present in practical devices. None of the aforementioned techniques addresses this problem.

A goal in the design and manufacture of imaging components, systems, or subsystems is to produce an image free of distortions or artifacts. In particular, it is desirable to prevent or reduce the addition of visible artifacts to the image by the imaging system components.

It is an object of the present invention to provide a method for determining at least one component of a noise pattern of an imaging device, so that this noise pattern component can be characterized, and the device adjusted, thereby producing images free of distortions or artifacts, or images containing reduced distortions or artifacts.

The above object is accomplished by an inventive method for determining at least one component of a noise pattern of an imaging device, comprising the steps of:
  providing flat field data with respect to the specific imaging device
  forming a preliminary estimate of banding components and streaking components, and
  determining the banding components, the two-dimensional random noise statistics and the streaking components.

Another object of the present invention is to provide a computer to program for determining at least one component of a noise pattern of an imaging device and thereby producing images free of distortions or artifacts.

The above object is accomplished by an inventive computer program, embodied on a computer readable medium for determining at least one component of a noise pattern of an imaging device, comprising:

a data input segment providing flat field data with respect to the specific imaging device, a calculation segment for forming a preliminary estimate of banding components and streaking components which are pat of said flat field data, and a plurality of data output segments providing a determination of the banding components, a two-dimensional random noise statistics and the streaking components.

A further object of the present invention is to provide an imaging device for determining at least one component of a noise pattern and thereby providing a correction tool for producing images with said imaging device, which are free of distortions or artifacts.

The above object is accomplished by an inventive imaging device, comprising:

a data input segment for providing flat field data, a control section for forming a preliminary estimate of banding components and streaking components, and determining the banding components, the two-dimensional random noise statistics and the streaking components, and a correction section for applying the determined banding components, the two-dimensional random noise statistics and the streaking components to image data.

BRIEF DESCRIPTION OF THE DRAWINGS

The subject matter of the invention is described with reference to the embodiments shown in the drawings.

DETAILED DESCRIPTION OF THE INVENTION

Theoretical Basis of Spectral Separation

Figure 1:
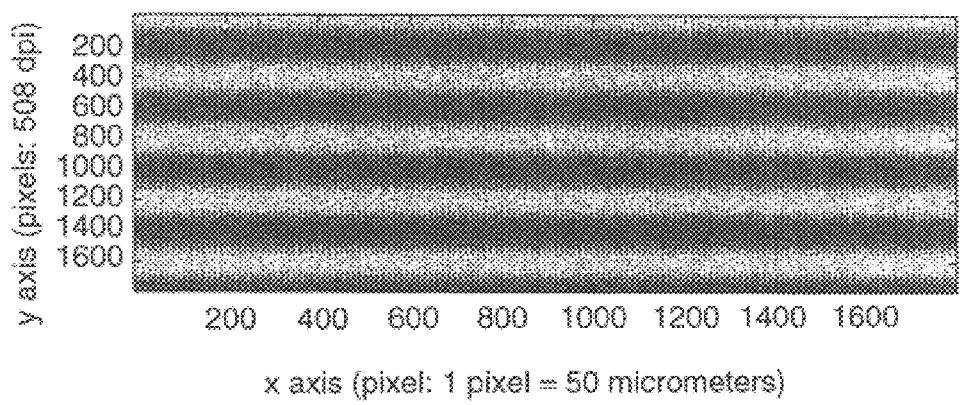
FIG. 1 is a synthetic image with banding along the fast scan and the slow scan axes of a printer.

The noise power spectrum (NPS) provides a statistical description of random fluctuations, based on (image) data from uniform areas (flat fields). If periodic fluctuations are also present in the data, however, conventional NPS measurements provide inaccurate information about the magnitude of these components (see P. D. Burns, "Measurement of Random and Periodic Image Noise in Raster-Written Images", *SPSE Conference on Advances in Non-Impact Printing Technologies,* 1984, pp. 139–142). If the NPS measurement is modified to accurately report the magnitude of these periodic components, then the random noise is not properly characterized.

The original applications of NPS (or Wiener spectrum) in imaging science were aimed at the characterization of photographic granularity. Photographic granularity is a two-dimensional random noise. Requirements for the existence of the NPS include stationarity, or shift-invariance of the noise pattern statistics, and a finite mean square value.

Photographic and electrophotographic granularity, as well as many sources of electronic noise, produce two-dimensional random noise patterns that satisfy these requirements. For two-dimensional isotropic random noise, a one-dimensional slice through the two-dimensional NPS surface can be obtained by scanning the noise pattern with a long, narrow slit, and applying the following estimator to the one-dimensional flat field scan data:

$$NPS_{1D}(v_j) = \left(\frac{L\Delta x}{MN}\right) \sum_{m=1}^{M} \left| \sum_{n=1}^{N} (d_m(n\Delta x) - \bar{d}) * e^{(-i2\pi v_j n\Delta x)} \right|^2 \quad \text{Eq. (1)}$$

where vj is the jth spatial frequency, L is the length of the measuring slit, N is the number of points per segment, m is the segment index, M is the number of segments, Δx is the sampling increment, d(x) represents a microdensity trace across a flat field, and $\bar{d}$ is the estimate of the mean density. In this case, a stable NPS estimate can be obtained that is independent of measuring slit length and segment length.

For one-dimensional artifacts such as banding or streaking, scanned perpendicular to the deterministic direction, application of Eq. (1) yields an NPS estimate that scales linearly with the slit length L. In addition, the estimates for patterns containing one-dimensional periodic structures (banding) scale linearly with the segment length N. Despite the dependence of the NPS estimate on L and N in the presence of one-dimensional artifacts, useful information is still readily obtainable. In cases where streaking and banding are present in both the x and y directions, along with two-dimensional random noise, a one-dimensional analysis is not sufficient to separate the artifacts. The analysis of these more complex patterns is based on the full two-dimensional NPS surface, which can be estimated as follows:

$$NPS_{2D}(v_{xj}, v_{yk}) = \left(\frac{\Delta x \Delta y}{MN_x N_y}\right) \sum_{m=1}^{M} |DTF_{2D}\{d_m(x, y) - \bar{d}\}|^2 \quad \text{Eq. (2)}$$

where DFT2D { } is the two dimensional discrete Fourier transform, given by $$DTF_{2D}\{g(x,y)\} = \sum_{p=1}^{N_x} \sum_{q=1}^{N_y} g(p\Delta x, q\Delta y) \cdot e^{(-i2\pi(v_{xj})p\Delta x)} \cdot e^{(i2\pi(v_{yk})q\Delta y)} \quad \text{Eq. (3)}$$

Here $v_x$ and $v_y$ are the spatial frequencies, $N_x$ and $N_y$ are the number of points in the x and y directions, respectively, for each two dimensional block, M is the number of blocks, and $\Delta x$, $\Delta y$ are the sampling increments in the x and y directions, respectively.

The spectral separation method proceeds by assuming that the banding, streaking and two-dimensional random noise components are additively superimposed, i.e.

$$d(x,y) = \bar{d} + g_{2D}(x,y) + s_x(x) + s_y(y) + b_x(x) + b_y(y) \quad \text{Eq. (4)}$$

where $d(x,y)$ represents a two-dimensional microdensity trace across a flat field, $g_{2D}(x,y)$ is a two-dimensional zero mean ergodic random process representing the image granularity, sx(x) and sy(y) are one-dimensional zero mean ergodic random processes representing the streaking in the x and y directions, respectively, and bx(x) and by(y) are one-dimensional zero mean periodic functions representing the banding in the x and y directions, respectively. The banding is assumed to be characterized by the following model (written here for the x direction only):

$$b_x(x) = \sum_j a_j \cos(2\pi v_j x + \phi_j) \quad \text{Eq. (5)}$$

where aj, vj, and φj are the amplitude, spatial frequency and phase of the jth component, respectively. A similar form is assumed for by(y).

In the spatial frequency domain, the random components in Eq. (4) lead to the following NPS:

$$NPS_{rand}(v_x,v_y) = G_{2D}(v_x,v_y) + S_x(v_x)\delta(v_y) + S_y(v_y)\delta(v_x) \quad \text{Eq. (6)}$$

where $G_{2D}(v_x,v_y)$ is the two-dimensional NPS of the image granularity, $S_x(v_x)$ and $S_y(v_y)$ are the one-dimensional NPS of the streaking in the x and y directions, respectively, and δ(v) is the Dirac delta function. Thus the image granularity produces a two-dimensional spectrum, while the streaking produces a continuous one-dimensional spectrum along each axis.

To understand the general appearance of these components in the two-dimensional NPS estimate, consider the Fourier transform of Eq. (5) (ignoring the phase angle $\phi_j$):

$$B_x(v_x) = \left(\frac{1}{2}\right) \sum_j a_j(\delta(v_x + v_j)\delta(v_y) + \delta(v_x - v_j)\delta(v_y)) \quad \text{Eq. (7)}$$

Thus the one dimensional periodic components generate a series of delta functions (e.g. line components) along the x and y axes, assuming that the banding is oriented along these axes.

The key to the present invention lies in: (1) the assumption of additivity, and (2) the recognition that two of the artifacts of interest are one-dimensional in nature, so that information regarding these artifacts is restricted to the axes of the two-dimensional NPS. Thus the artifact that is not restricted to the axes (granularity) can be estimated using the off-axis two-dimensional spectral information. The remaining two artifacts can then be separated because one creates a line spectrum (banding) while the other results in a continuous spectrum (streaking). In the preferred embodiment, the segmentation operations are performed in the following order: (1) banding estimation and removal; (2) granularity estimation; and (3) streaking estimation. Also in the preferred embodiment, the banding is removed first because of spectral leakage that biases the subsequent estimates of streaking and granularity. Each of these steps in the separation process will now be described in detail.

Banding Removal and Quantification

Figure 2:
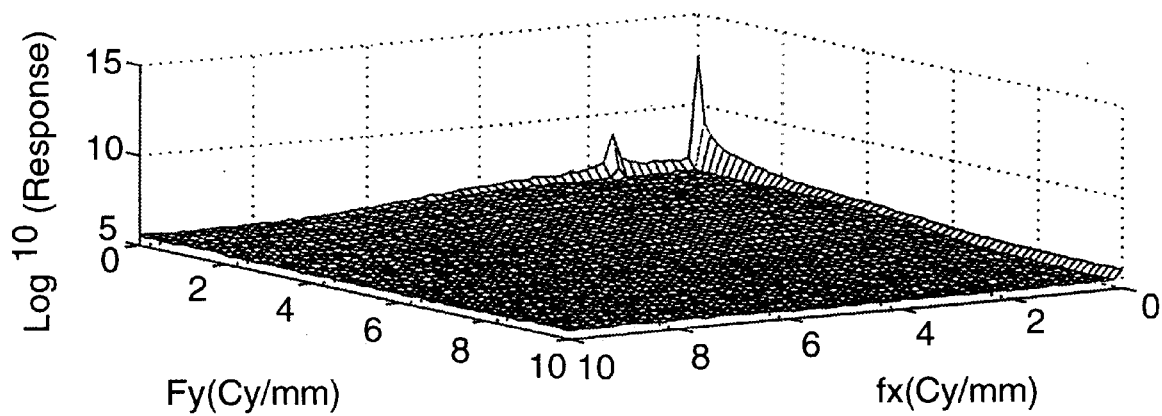
FIG. 2 is a two-dimensional power spectrum for the sample image as shown in FIG. 1.
Figure 3:
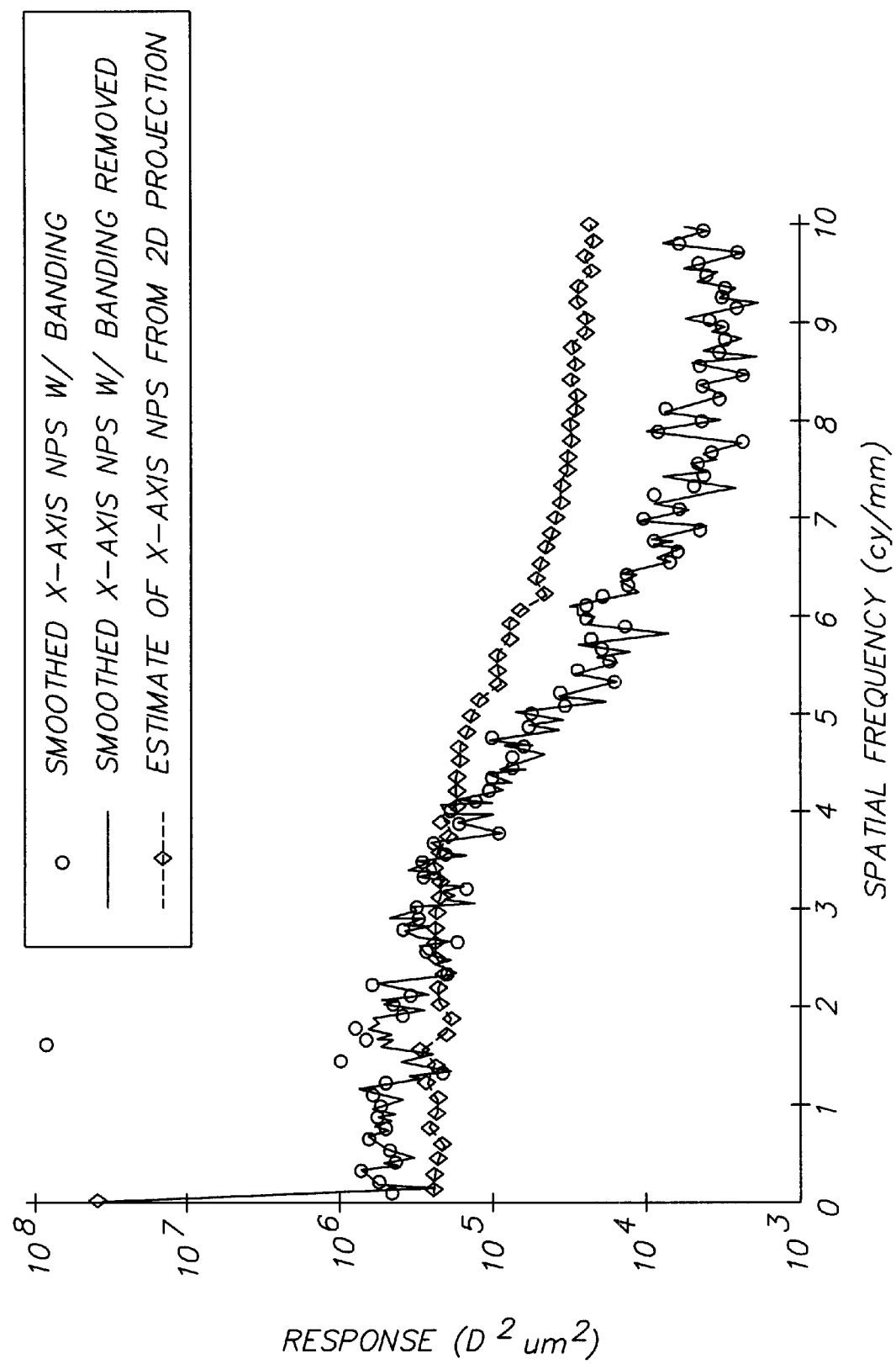
FIG. 3 are a one-dimensional and a two-dimensional estimate of the x-axis noise power spectrum.

FIG. 1 shows a synthetic image containing two-dimensional random noise, banding, and streaking artifacts. The banding occurs along the fast scan (x) and the slow scan (y) axes. The direction of fast scan is parallel to the width of a sheet of paper on which the image is printed. Analogous hereto, the slow scan direction is parallel to the length of the paper sheet. FIG. 2 shows a two-dimensional spectrum for a square block size of Nx=Ny=64 pixels out of FIG. 1. Note the broad peaks along the spectral axes (fx, fy). These are indicative of the banding present in the image. The magnitudes of the banding peaks and their frequencies can be estimated in a number of ways, for example, the technique described by Bouk et al. in "Measurement of Graininess for Halftone Electrophotography", *Proceedings of the IS&T's Eighth International Congress on Advances in Non-Impact Printing Technologies*, Oct. 25–30, 1992, pp. 166–170. The first step is to extract the axial portion of the two-dimensional NPS, then perform the banding estimation and removal, and finally reinsert the filtered axial spectrum back into the two-dimensional spectrum. The reinserted axial spectrum is now assumed to contain all streaking and all granularity power from along the axes; only the banding component has been removed. However, since both streaking and granularity result in continuous spectra, a separate estimate of one or the other is required in order to separate their individual contributions. This separate estimate is made for the granularity using the off-axis two-dimensional spectral information. Exactly how this is done is described below. FIG. 3 shows what happens when the granularity spectrum is subsequently extrapolated from the off-axis two-dimensional spectral data and compared with the total spectral data as estimated from the banding estimation step. At spatial frequencies above 4 cycles/mm the two-dimensional noise estimate is greater than the estimate of the total noise power for both streaking and granularity, arrived at from the banding removal step. The estimates are inconsistent.

Figure 7:
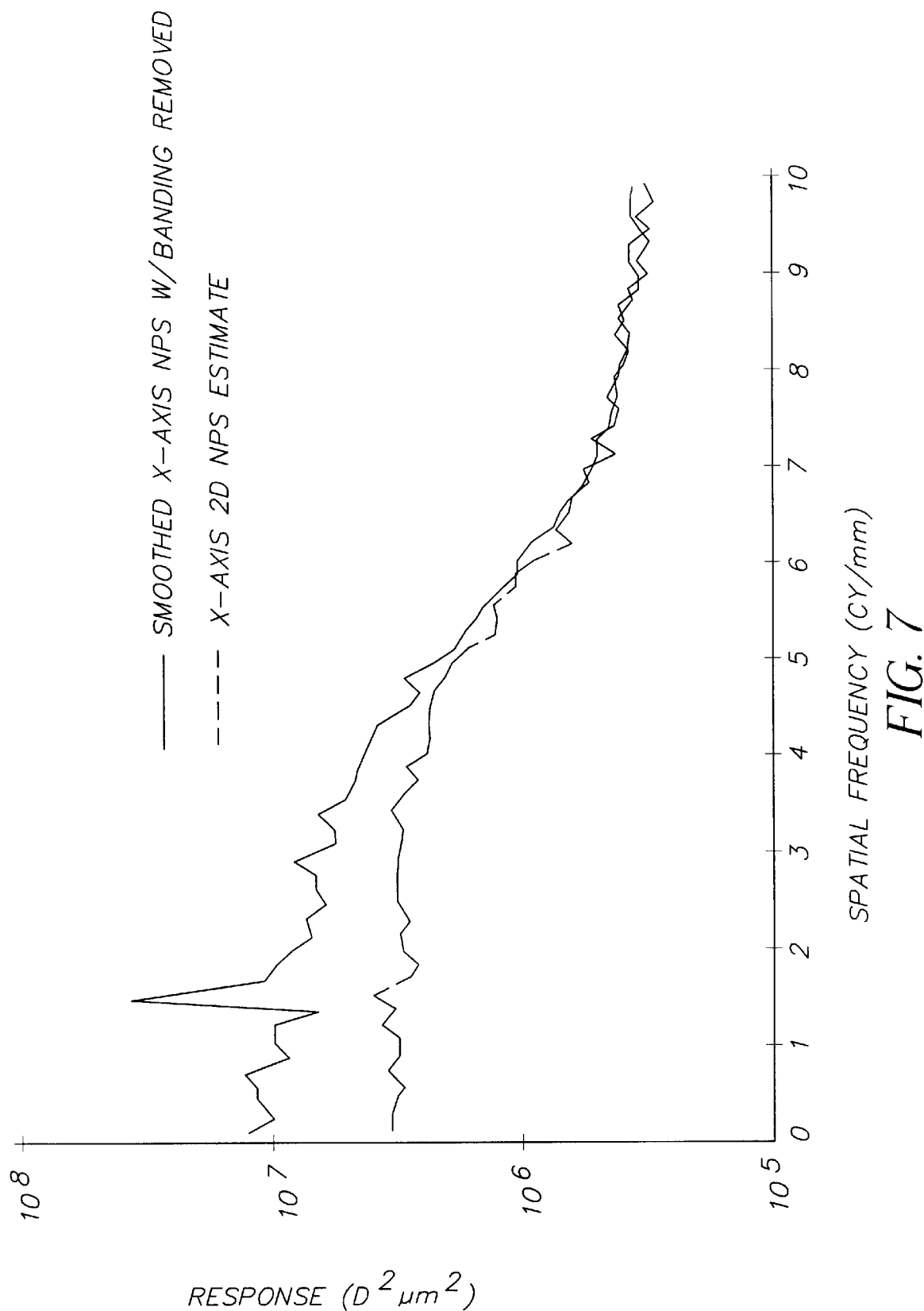
FIG. 7 is a one-dimensional and two-dimensional estimate of x axis noise power spectrum compared to a two-dimensional image filtering.

A possible explanation for this is off-axis spectral leakage from the original banding component. This was tested by implementing a two-dimensional generalization of the banding removal filter used in the signal estimation case cited previously. This was then applied to the synthetic image as shown in FIG. 1. FIG. 7 shows the two spectral estimates for FIG. 1 along the x axis. The estimates are now consistent. The observed inconsistency was caused by off-axis leakage of the banding component. Thus the banding component must be removed prior to estimating the other artifacts and it must be removed in a manner that avoids spectral leakage.

The banding which is actually expected from digital devices will be parallel to either the fast scan or the slow scan axis. This means that the images will all be similar to FIG. 1 rather than FIG. 4. If this is the case, then the two-dimensional banding removal filter is not required. A hybrid of one-dimensional and two-dimensional processing can be used instead. Row and column averages may be used to reduce the images to one-dimensional data, for purposes of estimating the spatial frequencies and amplitudes of interest along the two axes. Two-dimensional versions of the sine and cosine functions are then built and used to remove the banding component. Only after this banding component is removed is the two-dimensional spectrum generated, which is then used to estimate granularity and streaking. Since the banding component is removed before the two-dimensional spectrum is computed, leakage is virtually eliminated. This approach is significantly faster than processing the data as a two-dimensional image for eliminating the banding component, and yet it is equally effective for images whose banding is parallel to the two scan axes of the printer.

Figure 4:
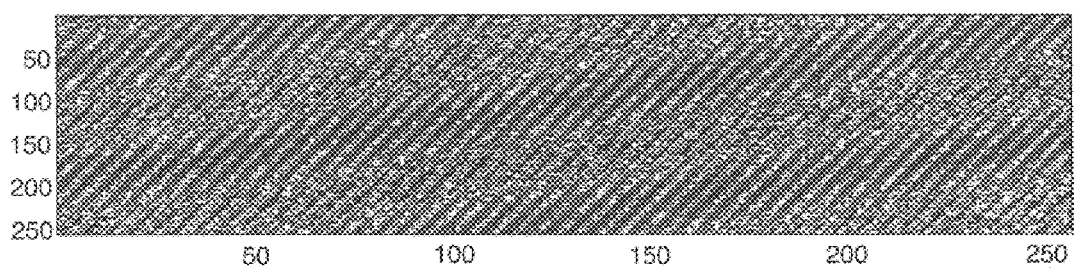
FIG. 4 is a synthetic image for evaluating a two-dimensional spatial frequency filter.
Figure 5:
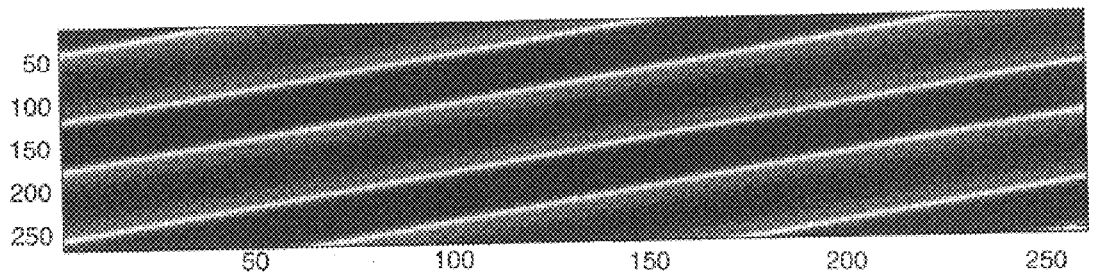
FIG. 5 is a synthetic image with high frequency banding removed from FIG. 1.
Figure 6:
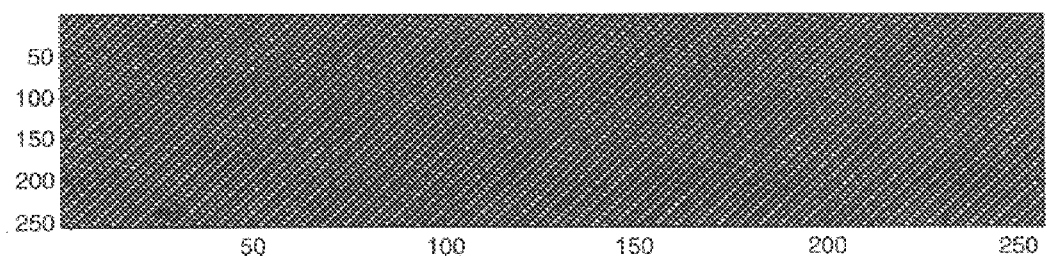
FIG. 6 is a synthetic image with low frequency banding removed from FIG. 1.

This two-dimensional delta-filter was tried on the synthetic image shown in FIG. 4. Since the delta-filter was two-dimensional, it was now necessary to create and remove two dimensional sinusoidal components from the image. This was accomplished by converting both the two-dimensional image and the two-dimensional sinusoids (sine and cosine) to one-dimensional vectors and then performing a standard least squares analysis. FIG. 5 and FIG. 6 show the effect of estimating, and removing separately, the high frequency and the low frequency banding components that had been introduced into the image. Having concluded from this that the two-dimensional delta-function filter was viable, it was then applied to the synthetic image as shown in FIG. 1. FIG. 7 shows the two spectral estimates for FIG. 1 along the x axis. The estimates are now consistent. The observed inconsistency was caused by off-axis leakage of the banding component. Thus the banding component must be removed prior to estimating the other artifacts and it must be removed in a manner that avoids spectral leakage.

RMS Granularity Estimation

The spectral power along the axes of the two-dimensional spectrum, after the banding components have been removed, represents the sum total of the streaking artifact and the granularity (see Eq. (6)). Since both artifacts result in continuous spectra, it is not possible to separate their individual contributions without an independent estimate of at least one of the artifact spectra. Since the granularity is the only artifact with a two-dimensional nature, it is possible to use the off-axis power of the two-dimensional spectrum to derive an independent estimate of the axial power distribution for the granularity. This is accomplished by taking a band adjacent to one of the axes, taken to be the x axis for the sake of specificity. In this example, the band used is $0<y<3$ cycles/mm for all values of the x axis of the two-dimensional NPS. The points in this y band, for each value of x, are fit by a quadratic model and then extrapolated to y=0, i.e. the granularity NPS along the x axis. The granularity NPS along the y-axis is arrived at similarly.

Streaking Estimation

With independent estimates of the granularity NPS along the x and y axes in hand, and again assuming additivity of artifacts. The next step is the determination of the streaking NPS along the x and y. From Eq. (6), we have:

$$\hat{S}_x(v_x) = NPS_{filt}(v_x, 0) - \hat{G}_{2D}(v_x, 0) \qquad \text{Eq. (8)}$$

and $$\hat{S}_y(v_y) = NPS_{filt}(0, v_y) - \hat{G}_{2D}(0, v_y) \qquad \text{Eq. (9)}$$

where $NPS_{filt}$ refers to the filtered two-dimensional NPS of the flat field scan (after banding removal), and $\hat{G}_{2D}(v_x, 0)$, $\hat{G}_{2D}(0, v_y)$ are the axial estimates of the two-dimensional granularity NPS, described above. In practice, the streaking NPS estimates should be low-clipped at zero, since the NPS is by definition a positive number. Because of random error in the NPS estimates (which is a decreasing function of the number of segments or blocks), it is possible for the differences in Eq. (8) and Eq. (9) to result in a negative value at frequencies where the streaking NPS approaches zero. Finally, the streaking NPS estimates of Eq. (8) and Eq. (9) must be divided by the block length of the two-dimensional NPS estimate along the orthogonal direction (i.e. $\hat{S}_x(v_x)$ should be divided by $N_y \Delta y$ and $\hat{S}_y(v_y)$ should be divided by $N_x \Delta x$), in order to obtain a properly scaled one dimensional streaking NPS estimate from the two-dimensional data. This scaling relationship is:

$$NPS_{1D}(v_{xj}) = \frac{NPS_{2D}(v_{xj}, 0)}{N_y \Delta_y} \qquad \text{Eq. (13)}$$

That is, the NPS of the one-dimensional pattern can be obtained from the k=0 slice of the two-dimensional NPS estimate, divided by the block length in the orthogonal direction. Note that this one-dimensional estimate does not include a slit correction, as expected for one dimensional patterns.

Quantitative Testing

Figure 8A:
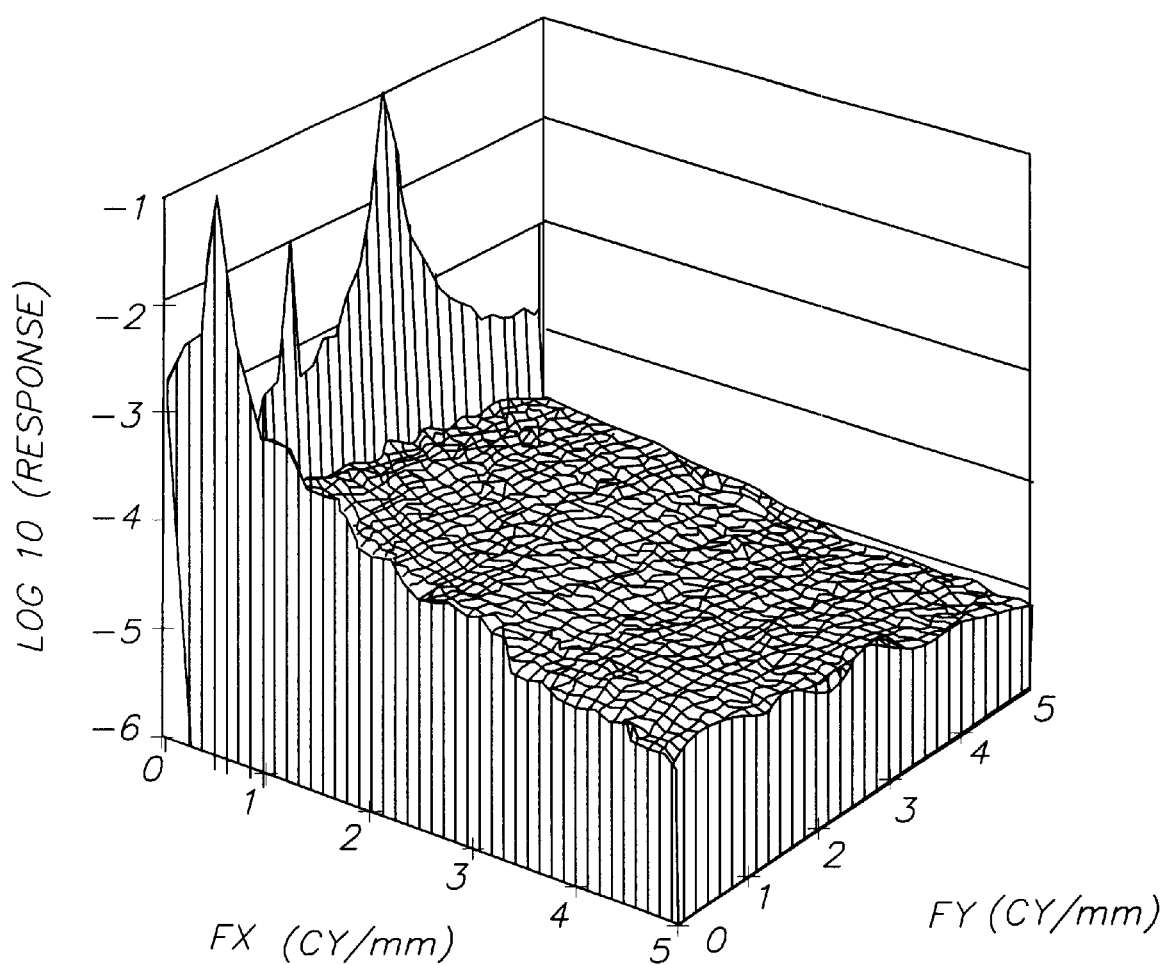
FIG. 8a shows the two-dimensional noise power spectrum surface for a synthetic pattern containing two-dimensional random noise.

The spectral separation method was rigorously tested by creating synthetic flat field patterns, composed of computer generated banding, streaking and granularity data. In all cases tested, the one-dimensional and two-dimensional noise patterns were composed of computer generated pseudo-random numbers, normally distributed and low pass filtered to simulate typical patterns encountered in practice. For example, FIG. 8a shows the two-dimensional NPS surface for a synthetic pattern containing two-dimensional random noise, streaking (along horizontal and vertical directions) and banding (also along both directions). Banding components were added at (nominal) frequencies of 0.5 cycles/mm along the direction of the x axis, and at 1.5 cycles/mm and 3.0 cycles/mm along the direction of the y axis. Table 1 shows the banding frequency and amplitude estimates that resulted from the banding filtering and removal procedure. These estimates agree well with the simulation input values, to within the precision of the measurement.

TABLE 1

Banding Estimates For Synthetic Data.

| frequency along x (cycles/mm) | Amplitude (optical density) | frequency along y (cycles/mm) | Amplitude (optical density) |
|---|---|---|---|
| 0.50 | 0.089 | 1.54 | 0.033 |
|  |  | 2.86 | 0.158 |

Figure 8B:
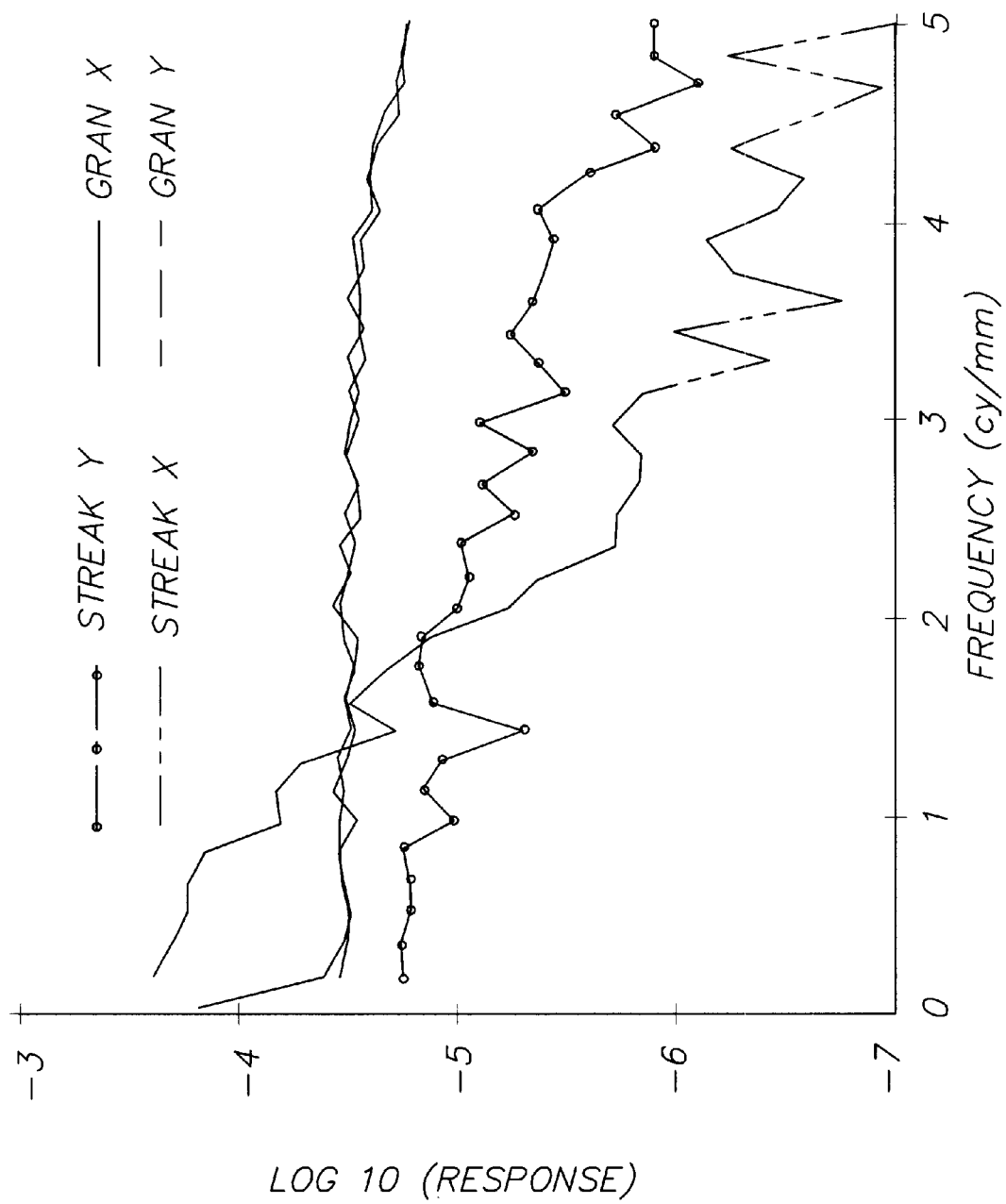
FIG. 8b shows the component one-dimensional estimates for the streaking and granularity noise power spectrum of the synthetic pattern.

FIG. 8b shows the component one-dimensional estimates for the streaking and granularity NPS of the synthetic pattern. These show excellent agreement with the known NPS of the input components. Note that the periodic components have been successfully filtered, along with the attendant spectral leakage (for a description of spectral leakage, see F. J. Harris, "On the Use of Windows for Harmonic Analysis with the Discrete Fourier Transform", Proceedings of the IEEE, Vol. 66, No. 1, January 1978, pp. 51–83). There is some evidence of a downward spike in the streaking NPS estimates at 1.5 cycles/mm, possibly due to a slight overestimation of the amplitude of this banding component.

Patterns composed of single and multiple components were tested. The resulting component NPS estimates were compared to the known NPS of the individual components, prior to combination, and demonstrated to be accurate to within the statistical precision of the NPS estimates.

We now give an example of a measurement made on a flat field print from a digital printer, to demonstrate the typical features and interpretation of the NPS of such devices.

The flat field was scanned on a reflection microdensitometer, using a 4× magnification objective with a numerical aperture of 0.1. Combining this objective with a 5× ocular and appropriate square aperture yields a nominal 50 micrometer square aperture at the specimen plane. An array of 1280 by 1280 points was scanned at 50 micrometer sample spacing, using an optical filter pack designed to simulate a $\bar{y}(\lambda)$ spectral response (photopic visual response) cascaded with a D5000 illuminant. The two-dimensional NPS estimates that follow were computed with square blocks of length 128.

Figure 9A:
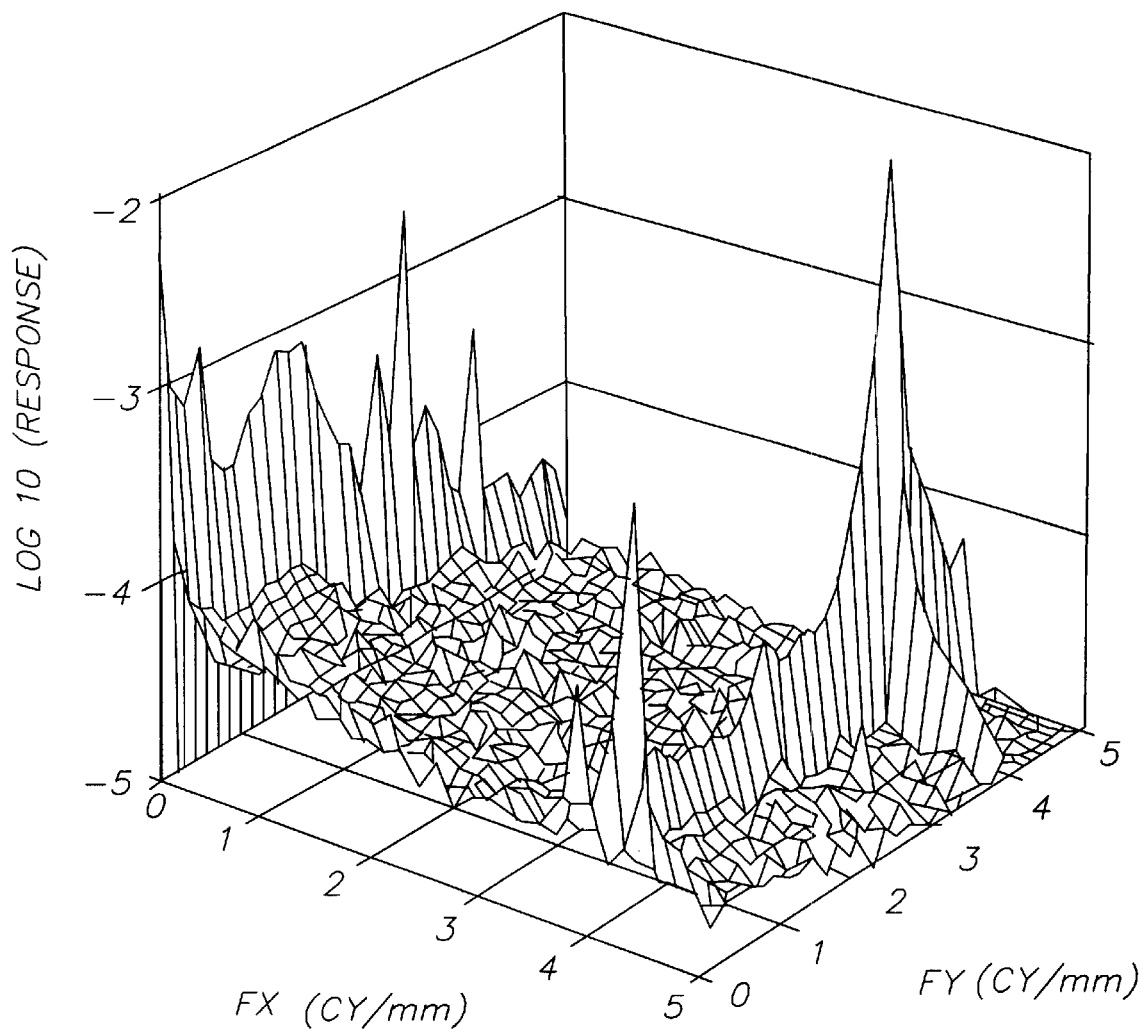
FIG. 9a shows the two-dimensional noise power spectrum surface computed from the scan of a flat field of visual density 0.8 produced by an electrophotographic printer.

FIG. 9a shows the two-dimensional NPS surface computed from the scan of a flat field of visual density 0.8 produced by a commercially available, electrophotographic laser printer. Prominent horizontal streaking is visible in the flat field, which produces the corresponding ridge in the two-dimensional NPS parallel to the y frequency axis. A triplet of spectral lines appears at roughly 4 cycles/mm, along both frequency axes and on the diagonal. The fact that these spectral lines appear in such a regular grid (as opposed to along one frequency axis only) is interpreted to be the result of a two-dimensional periodic pattern. The fact that there is no visually obvious one-dimensional banding in the field confirms this hypothesis. In this case, an attempt would still be made to filter the spectral lines along the frequency axes, in order to avoid spectral leakage and the resulting bias in the streaking NPS. However, the amplitude of the fitted one-dimensional periodic components would not be interpreted as the result of a banding pattern, but rather as a two-dimensional periodic pattern. Finally, the 2D random noise floor appears isotropic, again in agreement with direct observations.

Figure 9B:
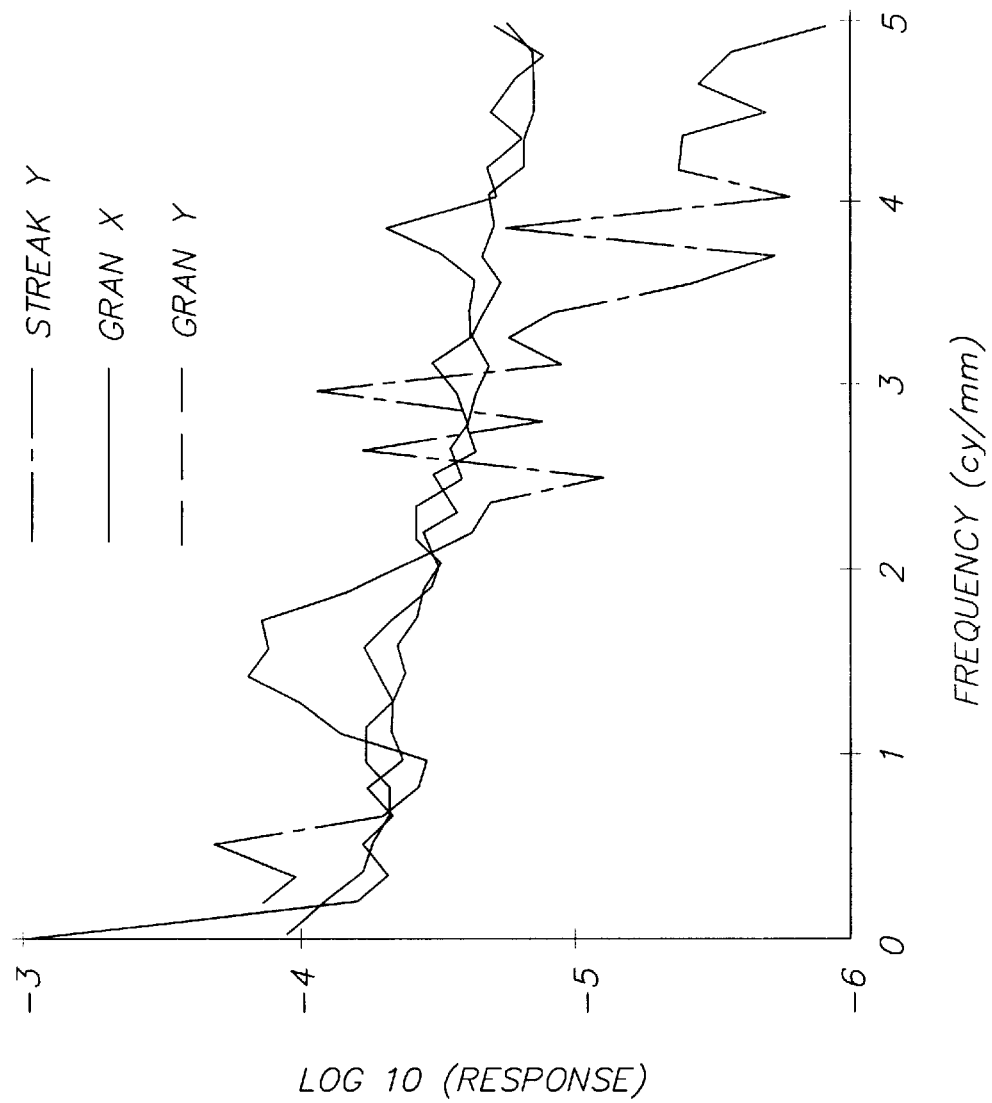
FIG. 9b shows the streaking noise power spectrum estimate along the direction of the y axis.

Table 2 shows the banding estimates for this printer sample. The banding components near 4 cycles/mm have comparable amplitudes that agree well with visual observations, and with amplitude estimates obtained from the axial NPS slices. The component along the y direction near 3 cycles/mm is also prominent. In addition, a component at 0.1 cycles/mm along the direction of the x axis, not obvious in the two-dimensional NPS plot, was identified using a one-dimensional NPS estimate with higher spectral resolution. The granularity NPS estimates (see FIG. 9b) are reasonable, compared with the two-dimensional noise floor seen in FIG. 9a. The streaking NPS estimate along the direction of the y axis (FIG. 9b), which has been scaled per Eq. (13), shows some evidence of residual banding, although the amplitudes have been greatly reduced, to perceptually negligible levels. The streaking NPS in the direction of the y axis is significant, and explains the majority of the line patterns seen in this flat field.

TABLE 2

Banding Estimates For Electrophotographic Laser Printer

| frequency along x (cycles/mm) | Amplitude (optical density) | frequency along y (cycles/mm) | Amplitude (optical density) |
|---|---|---|---|
| 0.10 | 0.002 | 2.96 | 0.016 |
| 3.91 | 0.002 | 3.93 | 0.005 |

Figure 10:
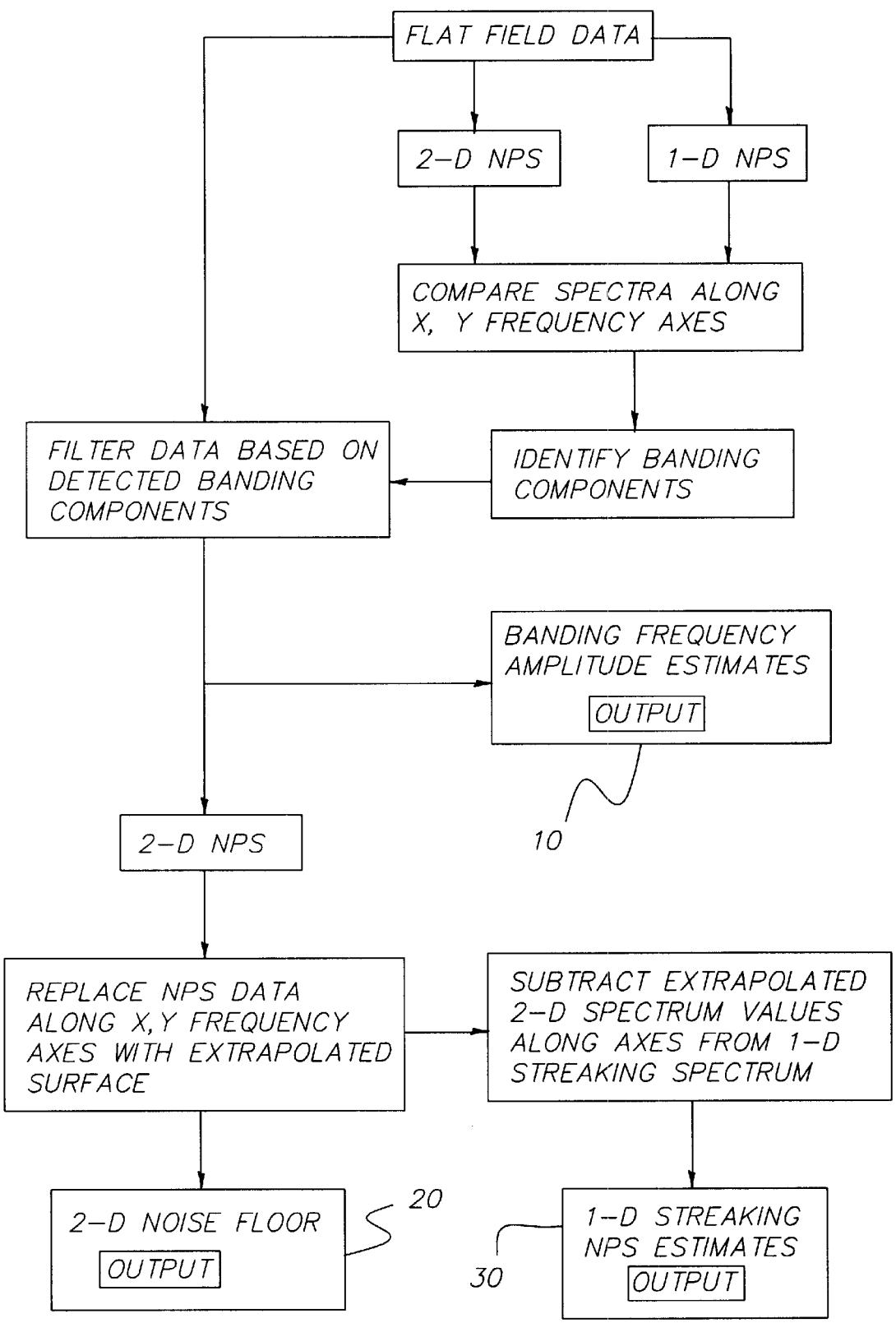
FIG. 10 shows a flowchart of the spectral separation algorithm.

A flowchart of the spectral separation method is shown in FIG. 10. The input image, which represents the scan of a flat field by a digital input device, or the scan of a flat field written by a digital output device, is read in, and both one-dimensional and two-dimensional NPS estimates are formed. The one-dimensional NPS estimates are obtained from spectral analysis of averages in the direction of the x and y axes. The one-dimensional and two-dimensional estimates are compared, and the spectral lines due to banding are identified. These periodic components are then filtered out of the flat field scan, as described previously. The banding frequency and amplitude estimates 10 are also output by the filtering algorithm during the course of the banding removal. The two-dimensional noise floor is then extrapolated to obtain the estimated axial components ($f_x=0$, $f_y=0$) of the two-dimensional noise floor 20 Subtracting these axial estimates from the original axial estimates yields the one-dimensional streaking NPS estimates 30.

It will be appreciated by those skilled in the art that the methods disclosed here can be applied to both monochrome (single color channel) and multiple color channel (for example, red, green and blue) images. Furthermore, the methods can be applied to each or all scans of a multiple color channel digital image, or to a color channel computed from the original, for example a luminance channel that is a weighted combination of red, green and blue values at each pixel.

It will also be appreciated by those skilled in the art that an imaging system or device may incorporate this invention into its components, in order to utilize the estimated two-dimensional random, one-dimensional streaking or one-dimensional banding components obtained using this invention to correct the image data, or to adjust the imaging system components or imaging system software to compensate for or remove any or all of the image noise.

The spectral separation algorithm has been encoded in Matlab 5; the necessary source code is listed in Appendix I. Currently the input to the program consists of a single channel image. It is obvious to anybody skilled in the art that other inputs are possible.

The invention has been described in detail with particular reference to certain preferred embodiments thereof, but it will be understood that variations and modifications can be effected within the spirit and scope of the invention.

APPENDIX 1

Source Code for Spectral Separation Algorithm:

```
function status = gnat(input_file,lines,pixels,npoints,dx,scale_factor)
%
% syntax: status = gnat(input_file,lines,pixels,npoints,dx,scale_factor);
%
% inputs:
% input_file is a one color, 2 byte per pixel, sun byte order image file
% (this can be generalized)
% lines, pixels are the image dimensions
% npoints is the number of points in x and y directions per transform
% block (this can be generalized to separate x and y dimensions)
% dx is the sample spacing along x and y (can also generalize for
% different spacings along x and y)
% scale_factor is the factor by which code values are divided to obtain
% density
%
% outputs:
% NPS files for granularity and banding (column data)
% files containing banding amplitudes (also, normalized by density and
% frequency weighting)
% file containing granularity and streaking metrics
status = 1;
% data input segment goes here
mean_density = mean(mean(image));
[nps2d,fx,fy,npsx,npsy,grain_x,grain_y,banding_data] =
spec_sep(image,npoints,npoints,dx,dx,input_file);
```

APPENDIX 1-continued

Source Code for Spectral Separation Algorithm:

```
disp('spectral separation complete');
% divide by record length used in 2D NPS to properly scale 1D streaking
estimates
record_length = npoints * dx/1000.0;
streak_x = abs(npsx' - grain_x) ./ record_length;
streak_y = abs(npsy - grain_y) ./ record_length;
streak_data = [fx streak_x fy streak_y];
grain_data = [fx,grain_x,fy,grain_y];
% results output section goes here
status = 0
% end gnat.m
function [resid_2Dps,fx2D,fy2D,npsx,npsy,nps_xproj,nps_yproj,
banding_data] = spec_sep(image,nx,ny,dx,dy,filename)
% dx, dy = sampling increments in microns
% nx, ny = x and y block lengths for partitioning FFTs
[resid,psx,psy,psfx,psfy,fx,fy,banding_data,flag] =. . .
remove_banding(image,dx,dy,filename);
[resid_2Dps,fx2D,fY2D] = ps2D(resid,dx,dy,nx,ny);
resid_2Dps = resid_2Dps ./ 1000000;
[nps_xproj,nps_yproj] = nps_quad_projection(resid_2Dps,fx2D,fy2D);
npsx = resid_2Dps(1,:);
npsy = resid_2Dps(:,1);
% end spec_sep.m
function       [resid,psx,psy,psfx,psfy,fx,fy,banding_data,flag]        =
remove_banding(image,dx,dy,filename);
%
%    syntax:
%              [resid,psx,psy,psfx,psfy,fx,fy,frqx,frqy] =
remove_banding(image,dx,dy);
%
%    remove_banding takes a 2D image as input, It computes 1D WS
from the
%    image cross-sections. It presents these spectra to the user and then
%    filters the axes selected by the user. This can mean either both axes,
%    either axis, or none at all.
%    flag will contain either a 0 for no filtering performed. A 1 for x-axis
%    filtering, a 2 for y-axis filtering or a 3 for both axes filtered. The
%    rows of image are defined as the y-axis.
%
[r c] = size(image);
xcsect = mean(image); % x-axis cross section
ycsect = mean(image'); % y-axis cross section
[psx fx] = ps(xcsect,dx); % power spectra for x-axis
[psy fy] = ps(ycsect,dy); % power spectra for y-axis
flag = 10;
xps = psx;
yps = psy;
resid = image; % initializing resid to allow for multiple filtering passes
bdatax = [ ];
bdatay = [ ];
while flag > 0
    [flag, fvec] = filter_query(xps,yps,fx,fy,filename);
%
%   select spatial frequencies to filter
%
    switch flag
       case 1
              [frqx r2x beta_x] = delta_filter2b(xcsect,dx,fvec(1:2));
%             frqy = 99;
          case 2
              [frqy r2y beta_y] = delta_filter2b(ycsect,dy,fvec(3:4));
%             frqx = 99;
          case 3
              [frqx r2x beta_x] = delta_filter2b(xcsect,dx,fvec(1:2));
              [frqy r2y beta_y] = delta_filter2b(ycsect,dy,fvec(3:4));
              case 0
       end
       if flag == 1 | flag == 3
          ampx = beta_x.^2;
          ampx = sqrt(sum(ampx(2:length(ampx))));
          bdatax = [bdatax [frqx ampx]];
       end
       if flag == 2 | flag == 3
          ampy = beta_y.^2;
          ampy = sqrt(sum(ampy(2:length(ampy))));
          bdatay = [bdatay [frqy ampy]];
       end
%
%    remove selected spatial frequencies from the image
%
       tpim = 2*pi*dx/1000; %   conversion for cy/mm to radians
       [xx yy] = meshgrid([1:c],[1:r]);
%
%    remove sinusoids of selected frequencies from image
%
       switch flag
          case 1
              clear yy
              xx = tpim*frqx*xx;
              resid = resid - beta_x(2)*cos(xx) - beta_x(3)*sin(xx);
          case 2
              clear xx
              yy = tpim*frqy*yy;
              resid = resid - beta_y(2)*cos(yy) - beta_y(3)*sin(yy);
          case 3
              xx = tpim*frqx*xx;
              resid = resid - beta_x(2)*cos(xx) - beta_x(3)*sin(xx);
              yy = tpim*frqy*yy;
              resid = resid - beta_y(2)*cos(yy) - beta_y(3)*sin(yy);
          case 0
       end
%
%    evaluate the effect of filtering
%
       switch flag
          case 1
              [psfx fx] = ps(mean(resid),dx);
              xps = psfx; xcsect = mean(resid);
          case 2
              [psfy fy] = ps(mean(resid'),dy);
              yps = psfy;   ycsect = mean(resid');
          case 3
              [psfx fx] = ps(mean(resid),dx);
              [psfy fy] = ps(mean(resid'),dy);
              xps = psfx; yps = psfy;
              xcsect = mean(resid); ycsect = mean(resid');
          case 0
       end
end
if length(bdatay) > length(bdatax)
    bdatax = [bdatax zeros(1,length(bdatay)-length(bdatax))];
elseif length(bdatax) > length(bdatay)
    bdatay = [bdatay zeros(1,length(bdatax)-length(bdatay))];
end
bdatax = reshape(bdatax,2,(length(bdatax)/2))';
bdatay = reshape(bdatay,2,(length(bdatay)/2))';
banding_data = [bdatax bdatay];
% end remove_banding.m
function [filfrq,r2,b] = delta_filter2b(a,dx,fvec);
%
%   syntax: [filfrq,r2,b] = delta_filter2b(a,dx,fvec);
%
% inputs:
% a = scan data;
% dx = scan increment (in microns);
% fvec = (center frequency, halfwidth of frequency window)
% outputs:
% filfrq = vector of halftone filter frequencies (in cy/mm);
% r2 = vector of R^2 values using delta filters at filfrq frequencies;
% b = delta-filter coefficients for each scan.
% note:   this function is the same as delta_filter except that it only
analyzes the
% first scan in it's attempt to assess the halftone frequency. It then
assumes
% that the frequency it arrives at for the first scan is also valid for all
% subsequent scans. This is the default approach used in gran_cm.m
tpim = 2*pi*dx/1000;
fnyq = 500/dx;
[rc] = size(a);
if(c > r),  % transpose row matrix to column matrix
      a = a';
      [rc] = size(a);   % r => no. of pts. per scan, c = no. of scans
end
for i=1
```

APPENDIX 1-continued

Source Code for Spectral Separation Algorithm:

```
% filter first scan data only
    [a_ps freq] = ps(a(:,i),dx);
    wf = find(freq > .01);
    if ( fvec(1) < 0 | fvec(1) > fnyq),     % check central frequency location
        disp('center spatial frequency specified is out of bounds');
        return
    end
    if (fvec(2) < fvec(1)),  %   check low end of frequency window
        z1 = fvec(1) - fvec(2); %   low end of frequency window
    else,
        disp('minimum spatial frequency must be greater than zero');
        return
    end
    if (fvec(1) + fvec(2) > fnyq), %   check high end of frequency window
        disp('maximum spatial frequency exceeds nyquist, being moved to nyquist');
        fvec(2) = fnyq - fvec(1);
        z2 = fnyq; z1 = fvec(1) - fvec(2); % upper end of window
    else,
        z2 = fvec(1) + fvec(2);   %   upper end of window
    end
%     express z1 and z2 in pixels rather than cy/mm.
    z1 = round(z1/freq(2)); z2 = round(z2/freq(2));
    [pv pp] = max(a_ps(wf(z1:z2))); % pv => peak value, pp => peak
                % position.
    pp = pp + z1 - 1;
    ihi = pp+1; ilow = pp-1; % initialize pointers to peak position.
%   ihi = pp+8; ilow = pp-8;
    rc2 = 0;cflfrq = 0; rp2 = rc2;
    b = zeros(3,c);
%
%
    while (rc2 >= rp2);
        pflfrq = cflfrq; % current filter freq. estim. becomes past filter freq. estimate
        rp2 = rc2;  % current R^2 value becomes past R^2 value.
        bp(:,i) = b(:,i); % current filter coefs become past filter coefs.
        %
        % evaluate contribution of one bin to the right.
        %
        ihi = ihi+1;
        wgtdfrq1 = dotproduct(freq(ilow:ihi),a_ps(ilow:ihi));
        totmod1 = sum(a_ps(ilow:ihi));
        cflfrq1 = tpim*wgtdfrq1/totmod1;
        c1 = cos(cflfrq1*[1:r])';
        s1 = sin(cflfrq1*[1:r])';
        %
        %   estimate delta filter coefficients and effectiveness of
            the filter (i.e. R^2)
        %
        [bh rh2] = lin_regr([c1 s1],a(:,i),0);
        %
        % evaluate contribution of one bin to the left.
        %
        ihi = ihi-1;
        ilow = ilow-1;
        wgtdfrq2 = dotproduct(freq(ilow:ihi),a_ps(ilow:ihi));
        totmod2 = sum(a_ps(ilow:ihi));
        cflfrq2 = tpim*wgtdfrq2/totmod2;
        c2 = cos(cflfrq2*[1:r])';
        s2 = sin(cflfrq2*[1:r])';
        %
        %   estimate delta filter coefficients and effectiveness of the filter
            (i.e. R^2)
        %
        [bl rl2] = lin_regr([c2 s2],a(:,i),0);
        %
        %
        if(rh2 > rl2),     % left bin lowers R^2 most
            ihi = ihi + 1;   % reset left bin pointer
            ilow = ilow + 1;   % reset right bin pointer
            cflfrq = cflfrq1; % establish current filter frequency
                estimate
```

APPENDIX 1-continued

Source Code for Spectral Separation Algorithm:

```
            rc2 = rh2;     % establish current R^2
            b(:,i) = bh;       % establish delta-filter coefficients
        else       % right bin lowers R^2 most
            cflfrq = cflfrq2; % establish current filter frequency
                estimate
            rc2 = rl2;     % establish current R^2
            b(:,i) = bl;       % establish delta-filter coefficients
        end
    end % exit here when another bin does not increase R^2 of regression
    r2(i) = rp2;
    filfrq(i) = pflfrq/tpim;
    b = bp;
end
if(c>1),
    filfrq(2:c) = filfrq(1)*ones(size(2:c));
    r2(2:c) = r2(1)*ones(size(2:c));
    b(:,2:c) = b(:,1)*ones(size(2:c));
end
% end delta_filter2b.m
function [nps_xproj,nps_yproj] = nps_quad_projection(nps,fx2D,fy2D);
%
%   syntax:
%   [nps_xproj,nps_yproj] = nps_quad_projection(nps,fx2D,fy2D);
%
[rx cy] = size(nps);
wx = find(fx2D > fx2D(2) & fx2D <= 3);
temp = nps(wx,:); temp = temp';
[coeffs corr_coef xhat] = quadratic_regr(fx2D(wx)',log10(temp'),0);
coeffs = 10.^(coeffs);     %     convert from log(PS) to PS
nps_xproj = coeffs(1,:)';
%
wy = find(fy2D > fy2D(2) & fy2D <= 3);
%
%   quadratic approach to nps projection
%
temp = nps(:,wy);
[coeffs corr_coef yhat] = quadratic_regr(fy2D(wy)',log10(temp'),0);
coeffs = 10.^(coeffs);     %     convert from log(PS) to PS
nps_yproj = coeffs(1,:)';
% end nps_quad_projection.m
```

What is claimed is:

1. A method for determining at least one component of a noise pattern of an imaging device, comprising the steps of:
   providing flat field data with respect to the specific imaging device;
   forming a preliminary estimate of banding components and streaking components; and
   determining the banding components, the two-dimensional random noise statistics and the streaking components.

2. The method as claimed in claim 1 wherein the imaging device is selected from the group of consisting of a printer, a film scanner, a document or print scanner and a digital camera.

3. A method for determining at least one component of a noise pattern of an imaging device, comprising the steps of:
   providing flat field data;
   forming a preliminary estimate of banding components by computing one-dimensional averages of the flat field data and carrying out a Fourier analysis of the one dimensional averages;
   determining the banding components by carrying out a two-dimensional Fourier analysis of the original flat field data, and comparing the result to the preliminary estimate;
   removing the banding components from the flat field data, to obtain modified flat field data;
   forming a second preliminary estimate of streaking components by carrying out a Fourier analysis on the modified flat field data;

determining the two-dimensional random noise statistics by carrying out a Fourier analysis on the modified flat field data; and determining the streaking components by modifying the preliminary estimate of the streaking components with the two-dimensional random noise statistics.

4. The method as claimed in claim 3 wherein the imaging device is selected form the group of consisting of a printer, a film scanner, a document or print scanner and a digital camera.

5. A computer program embodied on a computer readable medium for determining at least one component of a noise pattern of an imaging device, comprising:

a data input segment providing flat field data with respect to the specific imaging device;

a calculation segment for forming a preliminary estimate of banding components and streaking components which are part of said flat field data; and a plurality of data output segments providing a determination of the banding components, two-dimensional random noise statistics and the streaking components.

6. The computer program as claimed in claim 5 wherein the imaging device is selected from the group consisting of a printer, a film scanner, a document or print scanner and a digital camera.

7. The computer program as claimed in claim 5 wherein the imaging device is selected form the group of consisting of a printer, a film scanner, a document or print scanner and a digital camera.

8. A computer program embodied on a computer readable medium for determining at least one component of a noise pattern of an imaging device, comprising:

a data input segment providing flat field data;

a first estimate segment for forming preliminary banding components by computing one-dimensional averages of the flat field data and carrying out a Fourier analysis of the one dimensional averages;

a determination segment for calculation the banding components by carrying out a two-dimensional Fourier analysis of the original flat field data, and comparing the result to the preliminary banding components;

a filtering segment for removing the banding components from the flat field data, to obtain modified flat field data;

a second estimate segment for forming a second preliminary estimate of streaking components by carrying out a Fourier analysis on the modified flat field data;

a determination segment for determining the two-dimensional random noise statistics by carrying out a Fourier analysis on the modified flat field data; and a determination segment for determining the streaking components by modifying the preliminary estimate of the streaking components with the two-dimensional random noise statistics.

9. An imaging device comprising:

a data input segment for providing flat field data;

a control section for forming a preliminary estimate of banding components and streaking components, and determining the banding components, the two-dimensional random noise statistics and the streaking components; and a correction section for applying the determined banding components, the two-dimensional random noise statistics and the streaking components to image data.

10. The imaging device as claimed in claim 9 is chosen from the group consisting of a printer, a film scanner, a document or print scanner and a digital camera.

11. The imaging device as claimed in claim 9 wherein the control section comprises:

a first estimate means for forming preliminary banding components by computing one-dimensional averages of the flat field data and carrying out a Fourier analysis of the one dimensional averages;

a determination means for calculation the banding components by carrying out a two-dimensional Fourier analysis of the original flat field data, and comparing the result to the preliminary banding components;

a subtraction means for removing the banding components from the flat field data, to obtain modified flat field data;

a second estimate means for forming a second preliminary estimate of streaking components by carrying out a Fourier analysis on the modified flat field data;

a determination means for determining the two-dimensional random noise statistics by carrying out a Fourier analysis on the modified flat field data; and a determination means for determining the streaking components by modifying the preliminary estimate of the streaking components with the two-dimensional random noise statistics.

* * * * *